(12) United States Patent
Davis et al.

(10) Patent No.: US 9,710,309 B2
(45) Date of Patent: Jul. 18, 2017

(54) TASK SCHEDULING IN BIG AND LITTLE CORES

(71) Applicant: Lenovo (Singapore) Pte. Ltd., Singapore (SG)

(72) Inventors: Mark Charles Davis, Durham, NC (US); Howard Locker, Cary, NC (US); Daryl Cromer, Cary, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/661,146

(22) Filed: Mar. 18, 2015

(65) Prior Publication Data

US 2015/0261579 A1    Sep. 17, 2015

Related U.S. Application Data

(63) Continuation of application No. 13/590,467, filed on Aug. 21, 2012.

(51) Int. Cl.
*G06F 9/48* (2006.01)
*G06F 9/50* (2006.01)

(52) U.S. Cl.
CPC .......... *G06F 9/4881* (2013.01); *G06F 9/4893* (2013.01); *G06F 9/5044* (2013.01); *G06F 2209/5021* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 7,996,839 B2* | 8/2011 | Farkas et al. | 718/102 |
| 2010/0005474 A1* | 1/2010 | Sprangle et al. | 718/104 |
| 2013/0061237 A1* | 3/2013 | Zaarur et al. | 718/105 |

FOREIGN PATENT DOCUMENTS

CN    101354693 A    1/2009

OTHER PUBLICATIONS

Li et al., "Efficient Operating System Scheduling for Performance-Asymmetric Multi-Core Architectures", Nov. 2007, ACM.*

* cited by examiner

*Primary Examiner* — Qing Wu
(74) *Attorney, Agent, or Firm* — Ference & Associates LLC

(57) ABSTRACT

One aspect provides a method including: identifying a task to be scheduled for execution on an information handling device having a big core and a little core; in a state where the big core is available, scheduling the task for execution on the little core using a core signature for the task; directing the task to the little core for execution based on the scheduling; and executing the task on the little core. Other aspects are described and claimed.

18 Claims, 6 Drawing Sheets

TASK SCHEDULING IN BIG AND LITTLE CORES

CROSS REFERENCE TO RELATED APPLICATIONS

This application is a continuation of U.S. patent application Ser. No. 13/590,467, filed on Aug. 21, 2012, and entitled "TASK SCHEDULING IN BIG AND LITTLE CORES", the contents of which are incorporated by reference herein.

BACKGROUND

Conventional multi-core processors include a single component or chip, where multiple central processing units or cores are provided to read and execute program instructions. Typically, multi-core processors have cores that are the same in terms of processing power.

Currently, considering the energy efficiency demands of battery powered mobile devices, advances are being made with respect to providing multi-core chips that provide cores of different sizes. As a non-limiting example, the ARM CORTEX™-A7 processor provides both high performance as well as power savings, for example in terms of extended battery life. The aim is to connect the performance of a bigger core, for example the ARM CORTEX-A15 MPCORE™ processor with the energy efficiency of a littler core, for example the ARM CORTEX™-A7 processor. ARM CORTEX™-A7 MPCORE™ processor architecture and feature set is conserved with respect to that of the Cortex-A15 processor, with micro-architecture configured to provide energy efficiency by allowing the two processors to operate in tandem.

BRIEF SUMMARY

In summary, an aspect provides a method comprising: identifying a task to be scheduled for execution on an information handling device having a big core and a little core; in a state where the big core is available, scheduling the task for execution on the little core using a core signature for the task; directing the task to the little core for execution based on the scheduling; and executing the task on the little core.

Another aspect provides an information handling device, comprising: one or more processors; and a memory in communication with the one or more processors; the memory storing program instructions that when executed by the one or more processors: identify a task to be scheduled for execution on an information handling device having a big core and a little core; in a state where the big core is available, schedule the task for execution on the little core using a core signature for the task; direct the task to the little core for execution based on the scheduling; and execute the task on the little core.

A further aspect provides a program product, comprising: a storage device that stores code executable by a processor, the code comprising: code that identifies a task to be scheduled for execution on an information handling device having a big core and a little core; code that, in a state where the big core is available, schedules the task for execution on the little core using a core signature for the task; code that directs the task to the little core for execution based on the scheduling; and code that executes the task on the little core.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
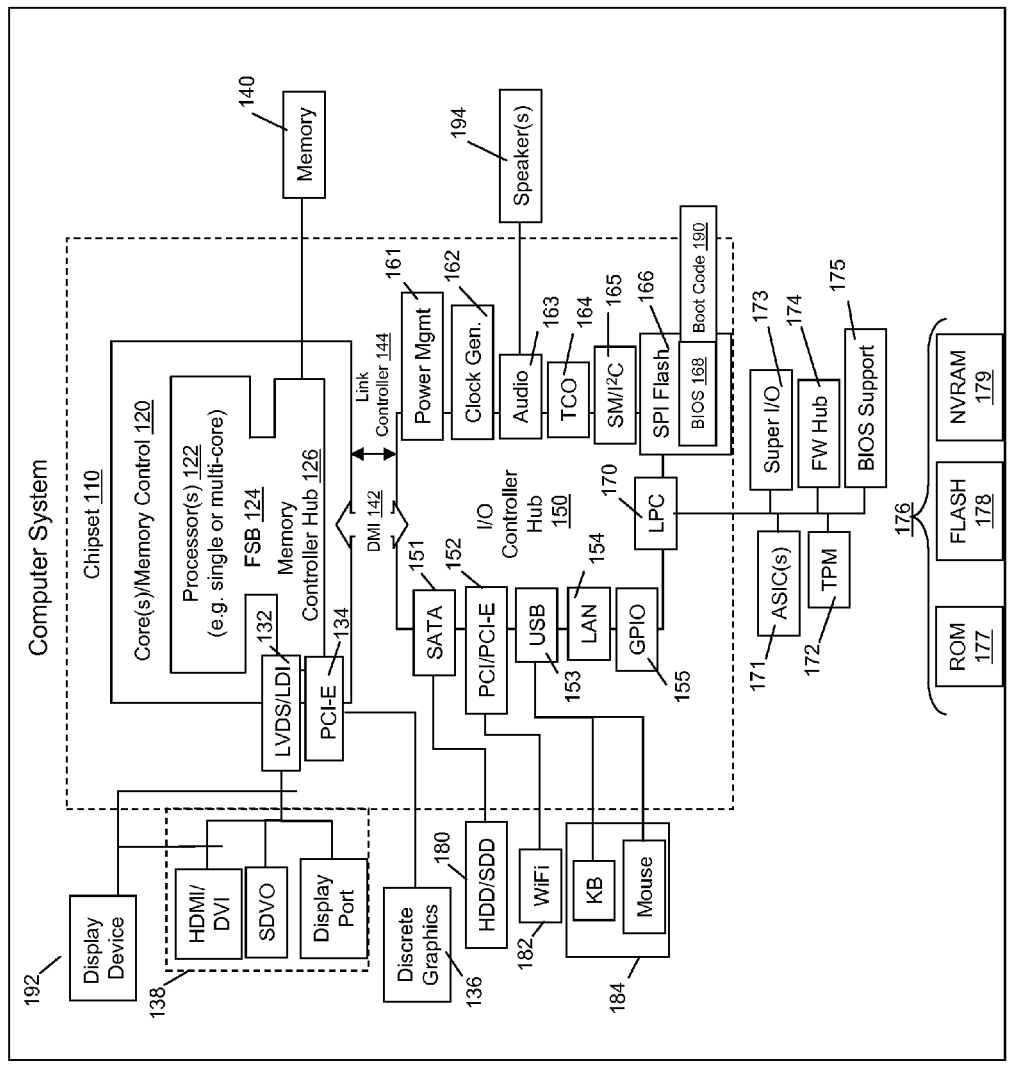
FIG. 1 illustrates an example information handling device.

It will be readily understood that the components of the embodiments, as generally described and illustrated in the figures herein, may be arranged and designed in a wide variety of different configurations in addition to the described example embodiments. Thus the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Increasing battery life is important to users of mobile devices that operate on battery power, sometimes for extended periods. Processor cores within System on Chip (SoC) designs take more power as performance increases. This is because either an increase clock frequency and/or additional logic are employed. Both approaches take more power to run the system.

Conventional multi-core processors each have the same performance, frequency, and power. The operating system schedules tasks to each core equally and does similar power management on each core. With the development of chips having multiple cores of different levels of performance on a common die (cores of different sizes), the cores may be employed differently. Because the littler cores take less power but have less performance, battery life will increase the more the littler core can be used (in favor of using the bigger core), as the system may turn off the bigger core when not in use to conserve battery. However, performance and even power savings may be degraded if the littler core is employed inappropriately.

Accordingly, an embodiment determines automatically how to schedule tasks for execution on little and big cores to maximize the use of the littler core(s), thereby allowing the big core(s) to be off as much as possible. Another embodiment provides for managing task scheduling using compile time options in the context of big and little cores. Another embodiment provides for managing task scheduling using interrupt handling procedures in the context of big and little cores.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, Display Port). The memory controller hub 126 also includes a PCI-express interface (PCI-e) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
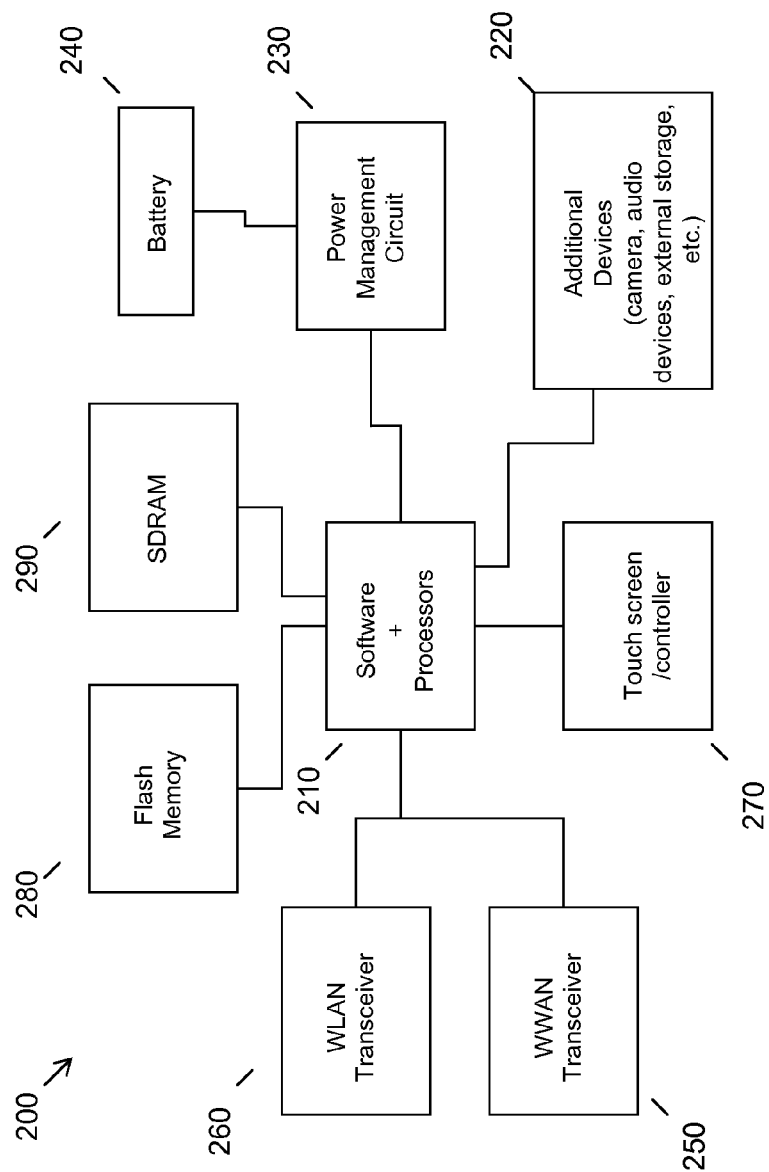
FIG. 2 illustrates another example information handling device.

For example, referring to FIG. 2, with regard to a battery powered device such as a smart phone and/or tablet circuitry 200, an example includes an ARM based system (system on a chip) design, with software and processors in a chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

Any mobile device, such as ARM based systems 200, may typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

Figure 3:
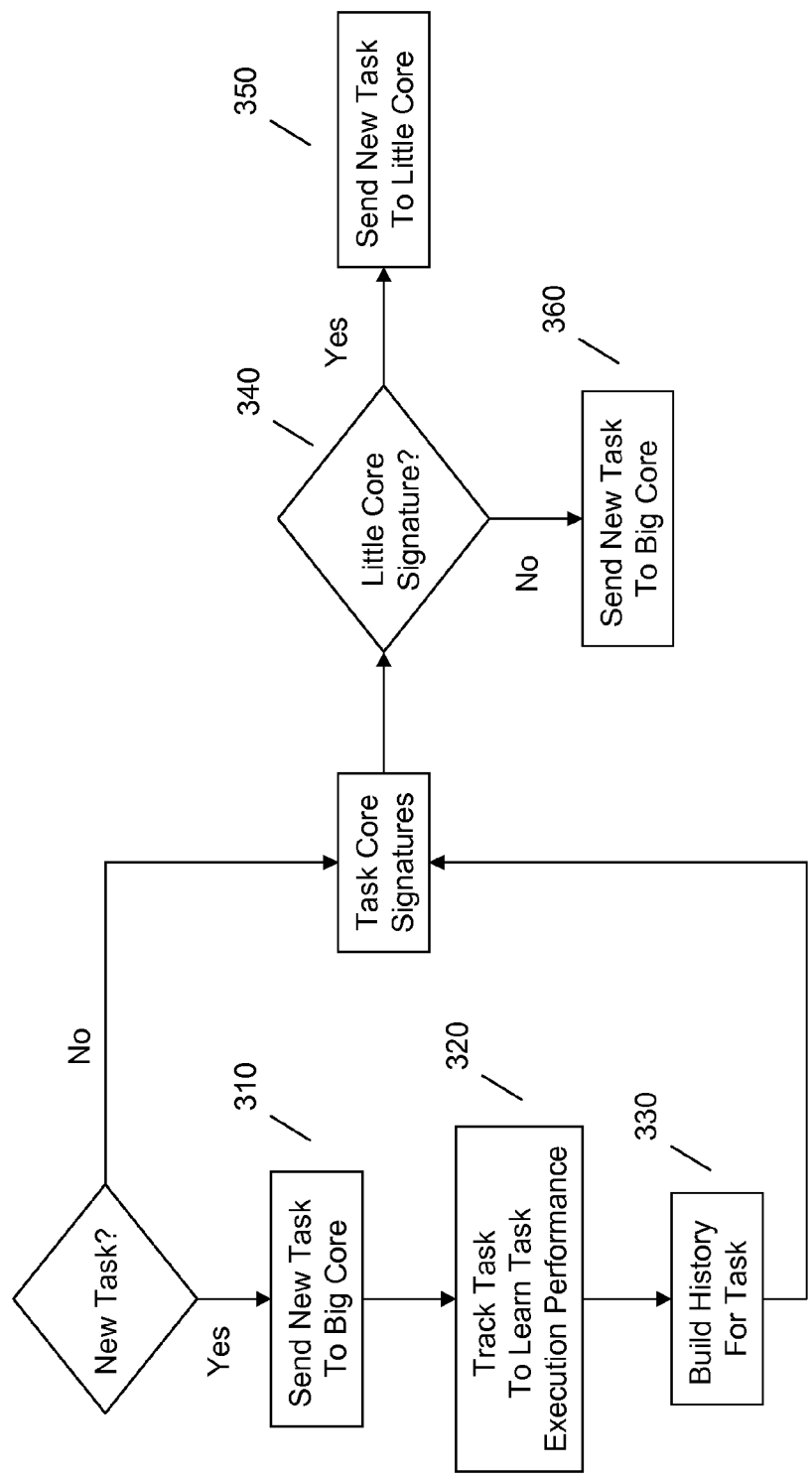
FIG. 3 illustrates an example of task scheduling.

Referring to FIG. 3, an embodiment may use predictive learning to determine which tasks can be best run in each core. For example, an embodiment may learn which applications are most appropriately executed on the little core. An embodiment may begin the learning process at 310 by starting "new" tasks, that is, a task (applications or processes) that have no execution history to facilitate learning, in the bigger cores as a mechanism to ensure acceptable performance. Alternatively, an embodiment may avoid this conservative approach in some situations, for example when compile time or programming options are employed, as further described herein.

An embodiment may then track one or more parameters as the task executes on the bigger core 320, as well as taking into consideration one or more characteristics of the task. For example, an embodiment may track a performance (execution) parameter such as the percentage of big core utilization or how long the task runs on the big core. Also, an embodiment may take into consideration one or more characteristics of the task, such as determining if the task is high priority, such an always running task, or for example a task needing to run when the system is always on, or determining if the task needs to run in an always connected mode (deep sleep modes), et cetera.

Over time an embodiment may thus build a history for each task 330 to inform the appropriate core signature for the task. Thus, an embodiment may then appropriately determine a scheduling policy for a given task, and assign a task a core signature for later use. For example, an embodiment may determine which tasks should move to the littler core based on the history for the tasks and the task characteristics, as reflected by the task core signature at 340. Thus for example, if a task is determined to have a little core signature 340, it may be directed to a little core at 350 on the chip; whereas is a task has a large or signature, it may be sent to a larger core 360. Some example determinations that may be made by an embodiment follow.

Figure 4:
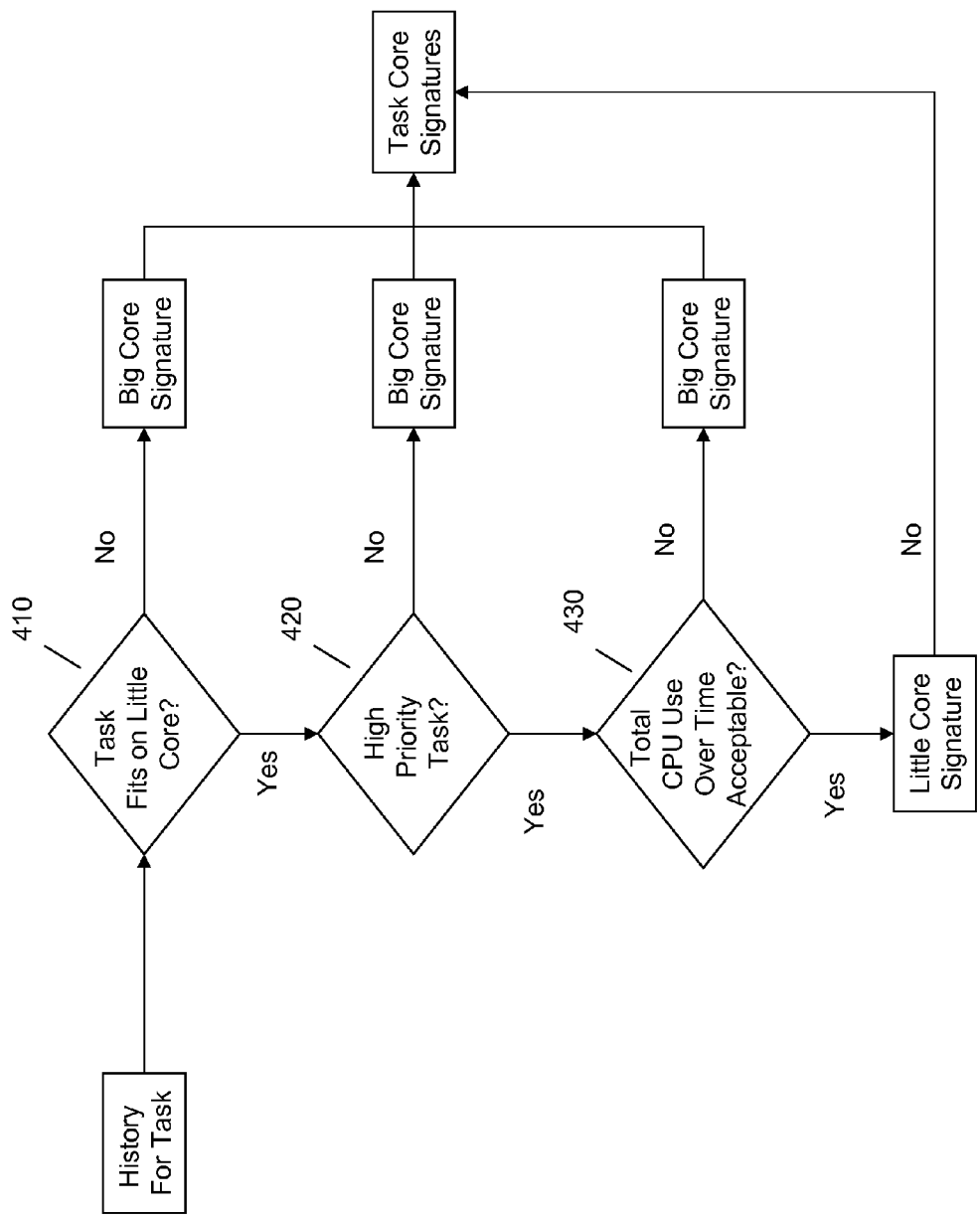
FIG. 4 illustrates an example of assigning core signatures to tasks.

Referring to FIG. 4, an embodiment may employ the task histories and/or characteristics to determine if a task should be directed to a big or little core. For example, an embodiment may use as a criterion a determination or estimation if the task can "fit" within the capability of the littler core 410. For example, an embodiment may calculate this "fit" by determining or having access to the ratio of the littler to the bigger core (for example, in terms of processing performance and/or other relevant parameters) and converting the percentage utilization in the bigger core to the littler core. Thus, an embodiment may track the task's execution on the bigger core in terms of percentage utilization of the bigger core and map that to the capability of the littler core. This information may be included in forming a core signature for the task.

Thus, if the task fits, an embodiment may then make a determination as to whether the task should be moved to the littler core. The outcome of this decision may depend on a variety of factors, for example if there are other tasks that also fit in the littler core that have higher priority, with higher priority being determined in a variety of ways (for example, use frequency, criticality, et cetera).

An embodiment may determine if the task is considered high priority at 420. Tasks with the highest priority may be directed into the littler core for execution, for example tasks that run when the system is in a heavy or deep sleep mode. These tasks are required for the Always On, Always Connected modes ("AOAC modes", for example, deep sleep) of the device. A reason for doing this is to be able to completely turn off the bigger cores in deep sleep modes. If the task fits both criteria (fits on the smaller core and has a high priority), a next step may include determining total CPU utilization over time 430 in order to ensure that if a task is placed on a small core, its CPU utilization (of that small core) is justified, even if it fits on the small core and is a high priority task.

Thus, there may be cases in which a high priority task that fits onto a littler core should nonetheless run on the larger core, for example because it will end up using more power given excessive CPU utilization on the smaller core as may be the case when the task takes a long time to complete or are repeatedly executed during a time frame or environment in which power conservation is not a primary concern (for example, when the device is plugged into a power source and the battery is charging). As tasks that fit in the littler core and run during AOAC modes tend to run more frequently (thus having a higher priority), these tasks are likely candidates for execution on a little core. Using this scheduling, an embodiment may optimize the tasks that are assigned to the littler core, thereby decreasing system power consumption as much as possible.

Figure 5:
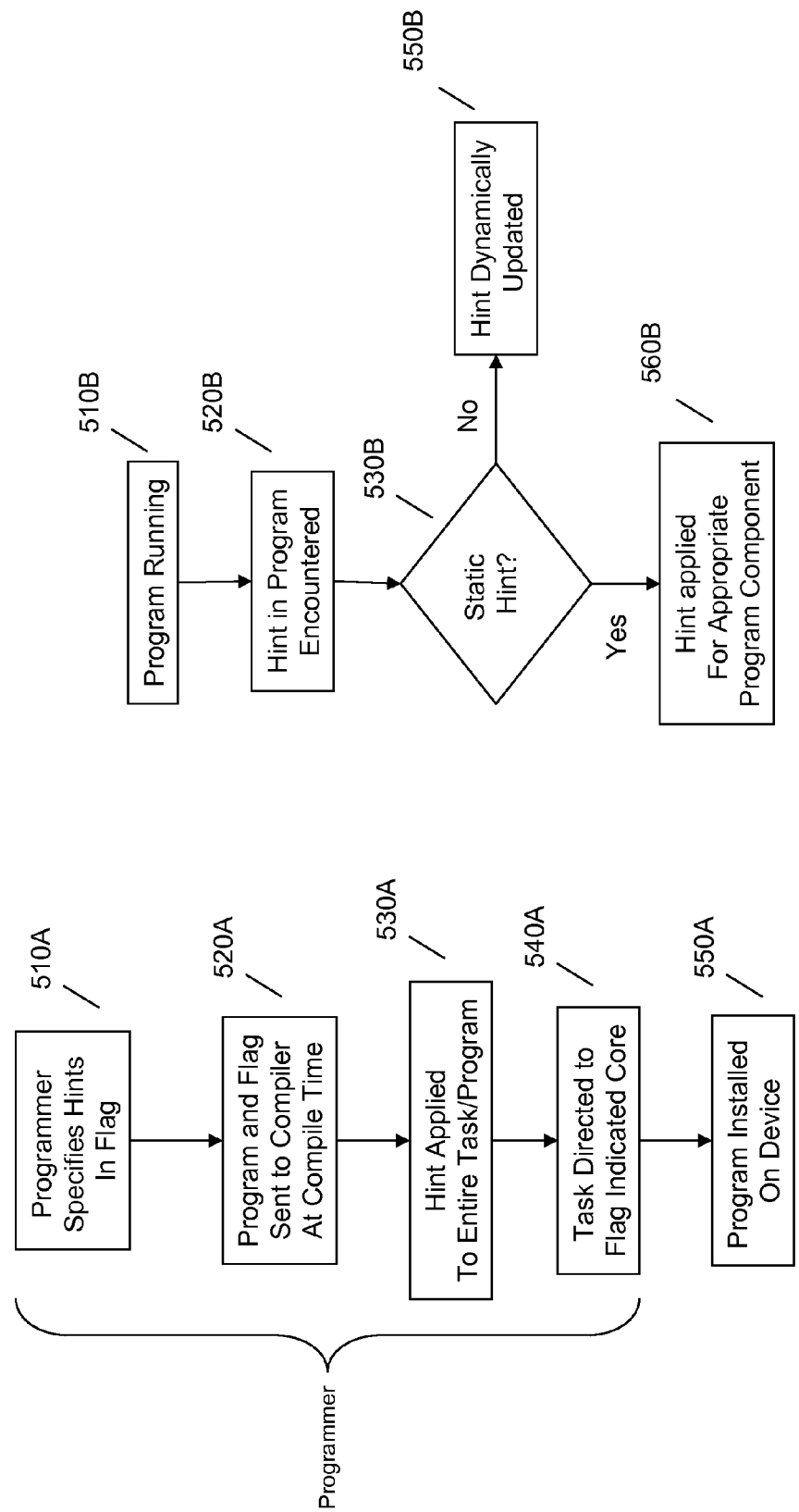
FIG. 5 (A-B) illustrates another example of task scheduling.

Referring to FIG. 5(A-B), an embodiment may provide hints that are programmed into the tasks or otherwise assigned to the tasks (or subcomponents thereof), thus enabling more opportunities for assigning the correct core signature to a task or task subcomponent. Again, because the littler cores take less power but have less performance, battery life will increase the more the system can use the smaller core and not use the larger cores, as the system may essentially turn off the larger cores when not in use. An embodiment provides hints in the tasks themselves in which a programmer may indicate, when writing a program, the best core to use. Thus, an embodiment makes selecting an appropriate core for the task at run time more efficient by programming a core signature or hint into the task program.

Determining the appropriate core to use in a conventional multi-core chip is based on recent experience running programs with no knowledge of the future needs of programs may be inappropriate in some situations. Because programmers can use compiler flags and language elements to indicate certain run time behaviors for tasks, such as instruction set features to use and dynamic versus static loading, these features may be advantageously applied in the context of a chip having big and little core architectures.

A programmer may be in a position to specify when writing a program how best to take advantage of large and small cores, since the nature of the program and an estimate of needed resources is available. Accordingly, an embodiment provides that the programmer may specify hints for core scheduling to include things such as 1) run this program on the smallest core available; 2) this program requires high performance cores; 3) dynamically assign this task to cores based on recent performance history; or other hints for core scheduling.

As illustrated in the example of FIG. 5A, the hints can be specified as a flag by the programmer 510A. Thus, the programmer specifies hint(s) 510A in a flag, which when the program and flag are sent to the compiler at compile time 520A, the hint is applied as appropriate (for example, to the entire task/program) 530A. In this situation, it is possible that the hint would apply statically to the entire program such that the program is directed to a core as indicated in the flag 540A. The program and hint(s) may then be installed on the device to run as programmed, that is, directed to appropriate core(s) according to the hint(s) 550A. Thus, the task may be appropriately directed to a littler or bigger core.

Hints may also be applied dynamically through language elements so that when the program runs 510B it can change the hint depending on the state of the program when the hint is encountered 520B. These hints can be either compiler directives (valid only at compile time) to indicate the hint for a section of code. Alternatively, a system function call may be used by the program to adjust the hint 550B, where the hint is not a static (fixed) hint 530B. For example, a program could cause a new thread to start. The code in the new thread might make a system call to specify that this thread can run entirely on the smallest, lowest-performance core available. Alternatively, if the hint is not to be dynamically updated, the hint may be applied as initially programmed to the program sub component 560B.

An embodiment may also include interrupt handling in a task scheduling policy to leverage the availability of big and little cores on a chip. As described herein, big and little core machines combine CPU's of different size and thus having a different number of transistors in the same package or chip. These big-little designs, if managed appropriately, can result in significant power savings because the smaller CPU's are much more efficient for small tasks. According to an embodiment, interrupt handling is configured to take advantage of the power savings afforded by such an execution environment.

Conventionally in multiple CPU systems interrupts are steered either randomly or to a specific CPU, such as the last CPU to run the device driver associated with the interrupt. These approaches will not necessarily give the best performance when different sizes and power consumption CPU's (big and little cores) are in use.

Figure 6:
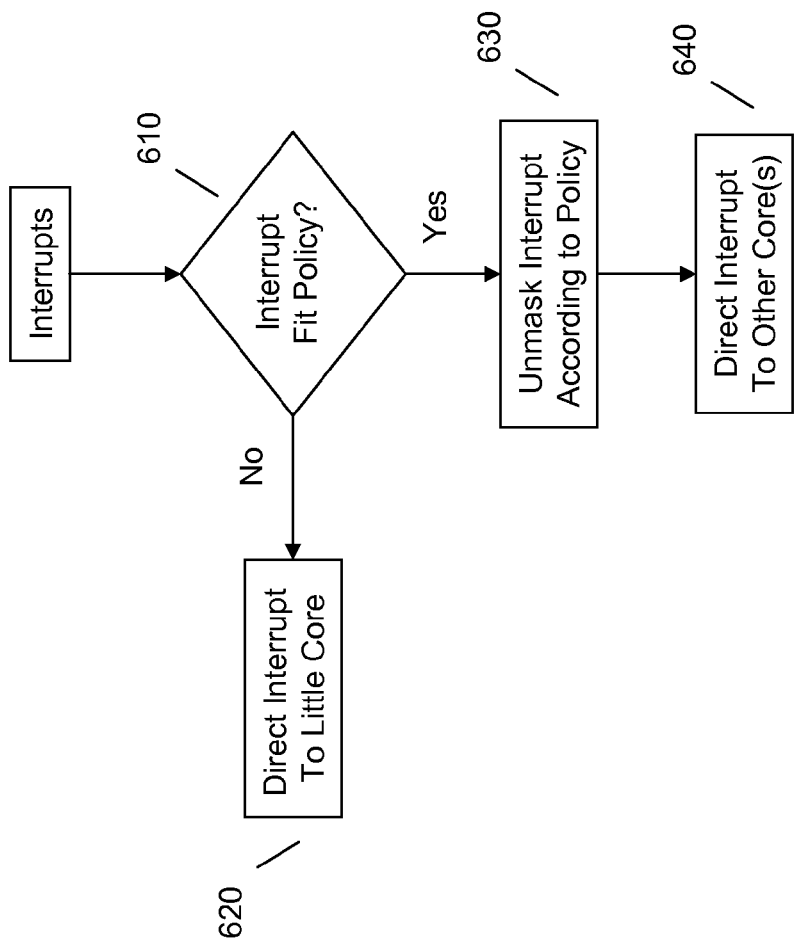
FIG. 6 illustrates another example of task scheduling.

Accordingly, in an embodiment illustrated in FIG. 6, interrupts to all CPU's may be masked except for one low power (little) CPU. For example, by default and at boot, an embodiment may route all or nearly all interrupts to this little core. An embodiment may unmask the interrupts according to an appropriate policy.

For example, as the result of operational history of a task, for example for a given device driver's saturation of the cycles of the little core, or by special configuration or policy, other cores can have the interrupts unmasked. Thus, on an interrupt, the operational history of the task can be ascertained in order to determine if the interrupt fits a policy justifying unmasking at 610. If not, the interrupt may be defaulted to a little core at 620. However, if the interrupt does fit a policy for directing the interrupt to a big core at 610, the interrupt may be unmasked according to the policy at 630 and directed to a big core for handling at 640. Some example cases where unmasking the interrupts according to a policy so as to let them be directed and handled by other (for example, big) cores are as follows.

In a first example, if processing a given interrupt has a history of consuming all of or a substantial fraction of the little core CPU power available, for example it exceeds some threshold value, such an interrupt may be routed on one or more big cores, as these are high performance CPU's. Thus, the energy savings will be attained, even though the bigger core needs to be utilized, by virtue of directing an interrupt known to be processing intensive to an appropriately sized core.

In a second example, an interrupt frequency may be known to be so high that when directed repeatedly to a little core, the CPU cannot handle the interrupts. In such a situation, interrupts may be dropped or all little core CPU cycles are taken for some period (for example, 100 milliseconds). Multiple interrupts of this variety may be assigned to multiple CPU's to equalize the loading. In such a circumstance, the chip environment may be ascertained to determine if the appropriate directing of the interrupts is to one or more small cores or one or more big cores, or some suitable combination of the foregoing, according to a predetermine policy.

In a third example, a developer or administrator may know a particular driver or other task requires a high performance CPU. Accordingly, in an embodiment the kernel may be configured to mask the associated interrupt to a high performing (big) CPU for handling.

As described herein, various embodiments provide for a variety of task handling or scheduling procedures such that a big/little core environment may be optimally utilized. In an embodiment, predictive or dynamic task scheduling may be utilized, or static task scheduling may be utilized. In an embodiment, both predictive and static task handling may be utilized, depending on the operating environment (for example, operating or charging state of the device), the nature of the task to be scheduled (for example, a task having a known history, a task having hints included therewith or therein, et cetera). It should be noted that although specific examples of tasks have been given (programs, interrupts, application program sub-components or threads), and specific task handling or scheduling procedures explained, these are non-limiting examples and the various aspects may be combined in any suitable fashion to achieve an appropriate scheduling of the task workload between big and little cores.

Embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof. While mobile computing systems such as tablet computers, laptop computers, and smart phones have been specifically mentioned as examples herein, embodiments may be implemented using other systems or devices, such as e-readers, navigation systems, kiosks, and the like.

Moreover, it should be noted that although big and little core examples have been given herein, the principles and aspects of the various embodiments may be extended to devices having three or more cores, of varying sizes, commensurate with the teachings herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied thereon.

Any combination of one or more non-signal device readable medium(s) may be utilized. The non-signal medium may be a storage medium. A storage medium may be, for example, an electronic, magnetic, electromagnetic, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
    identifying a task to be scheduled for execution on an information handling device having a big core and a little core, wherein the little core is a lower power central processing unit with respect to the big core;
    scheduling the task for execution on the little core using a core signature for the task, wherein the core signature identifies the task as a task to be executed on the little core and is assigned before execution of the task on the information handling device and wherein the core signature is based upon determining if the task is executable on the little core within a threshold tolerance with respect to little core utilization;
    directing the task to the little core for execution based on the scheduling;
    entering the big core into a reduced power mode; and
    executing and completing the task on the little core.

2. The method of claim 1, wherein the core signature comprises a tracked execution history.

3. The method of claim 2, wherein the tracked execution history comprises a percentage utilization of the task in the big core.

4. The method of claim 1, wherein the core signature comprises an ascertained task characteristic.

5. The method of claim 4, wherein the ascertained task characteristic comprises a characteristic indicating that the task is a high priority task.

6. The method of claim 1, wherein the core signature is programmed for the task and comprises a hint associated with the entire task.

7. The method of claim 1, wherein the core signature is programmed for the task and comprises a hint associated with a sub-component of the task.

8. The method of claim 1, wherein the core signature is programmed for the task and is static.

9. The method of claim 1, wherein the core signature is programmed for the task and is dynamically updated during execution of the task.

10. An information handling device, comprising:
    one or more processors; and
    a memory in communication with the one or more processors;
    the memory storing program instructions that when executed by the one or more processors:
    identify a task to be scheduled for execution on an information handling device having a big core and a little core, wherein the little core is a lower power central processing unit with respect to the big core;
    schedule the task for execution on the little core using a core signature for the task, wherein the core signature identifies the task as a task to be executed on the little core and is assigned before execution of the task on the information handling device and wherein the core signature is based upon determining if the task is executable on the little core within a threshold tolerance with respect to little core utilization;
    enter the big core into a reduced power mode;
    direct the task to the little core for execution based on the scheduling; and
    execute and complete the task on the little core.

11. The information handling device of claim 10, wherein the core signature comprises a tracked execution history.

12. The information handling device of claim 10, wherein the core signature comprises an ascertained task characteristic.

13. The information handling device of claim 12, wherein the ascertained task characteristic comprises a characteristic indicating that the task is a high priority task.

14. The information handling device of claim 10, wherein the core signature is programmed for the task and comprises a hint associated with the entire task.

15. The information handling device of claim 10, wherein the core signature is programmed for the task and comprises a hint associated with a sub-component of the task.

16. The information handling device of claim 10, wherein the core signature is programmed for the task and is static.

17. The information handling device of claim 10, wherein the core signature is programmed for the task and is dynamically updated during execution of the task.

18. A program product, comprising:
    a storage device that stores code executable by a processor, the code comprising:
    code that identifies a task to be scheduled for execution on an information handling device having a big core and a little core, wherein the little core is a lower power central processing unit with respect to the big core;
    code that schedules the task for execution on the little core using a core signature for the task, wherein the core signature identifies the task as a task to be executed on the little core and is assigned before execution of the task on the information handling device and wherein the core signature is based upon determining if the task is executable on the little core within a threshold tolerance with respect to little core utilization;
    code that enters the big core into a sleep mode;
    code that directs the task to the little core for execution based on the scheduling; and
    code that executes and completes the task on the little core.

* * * * *